(12) United States Patent
Gardner et al.

(10) Patent No.: US 9,627,000 B1
(45) Date of Patent: Apr. 18, 2017

(54) CANARY TESTING FOR STORAGE DEVICES

(71) Applicant: Facebook, Inc., Menlo Park, CA (US)

(72) Inventors: Darryl Edward Gardner, Newark, CA (US); Yashar Bayani, Menlo Park, CA (US); Zhanhai Qin, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/968,551

(22) Filed: Dec. 14, 2015

(51) Int. Cl.
*G11C 29/00* (2006.01)
*G11B 20/18* (2006.01)
*G11B 27/36* (2006.01)
*G06F 11/36* (2006.01)

(52) U.S. Cl.
CPC ...... *G11B 20/1816* (2013.01); *G06F 11/3664* (2013.01); *G11B 27/36* (2013.01)

(58) Field of Classification Search
CPC ... G11B 20/1816; G11B 27/36; G06F 11/263; G06F 11/2635; G06F 11/3664; G11C 2029/1208; G11C 29/36

USPC ............ 714/718, 719, 742, 738, 33, 57, 42
See application file for complete search history.

(56) References Cited

U.S. PATENT DOCUMENTS

| | | | | |
|---|---|---|---|---|
| 6,678,643 | B1 * | 1/2004 | Turnquist | G01R 31/318307 703/14 |
| 9,472,261 | B1 * | 10/2016 | Chun | G11C 29/023 |
| 2014/0098948 | A1 * | 4/2014 | Kulkarni | H04L 51/046 379/265.03 |
| 2015/0154097 | A1 * | 6/2015 | Duda | G06F 11/3688 714/38.1 |

* cited by examiner

*Primary Examiner* — Christine Tu
(74) *Attorney, Agent, or Firm* — Perkins Coie LLP

(57) ABSTRACT

Embodiments are disclosed for analyzing data storage devices. The present disclosure employs a "canary" test that selects multiple storage devices and tests the same for a predetermined period of time. By analyzing the statuses of the storage devices monitored and recorded during the applicable tests, the present disclosure can generate an analytical result regarding the characteristics of the storage devices. The analytical result can be presented to an operator in a meaningful way so as to enable him or her to make an informed decision when utilizing a storage device with characteristics similar to the tested storage devices.

20 Claims, 4 Drawing Sheets

CANARY TESTING FOR STORAGE DEVICES

BACKGROUND

Historically, canaries were used to alert coal miners when toxic gases in coal mine tunnels reached dangerous levels. A canary testing in computer science industries can be defined as an automated, nondestructive test that is run on a regular basis in a close-to-real-world environment so as to detect or predict the happening of certain events.

A network system involving a large number of users requires a significant amount of computing resources, such as storage devices. These storage devices play an important role in maintaining normal daily operations of the network. Failure of the storage devices can result in system failures, malfunctions, and/or suspension of online services. Therefore, prediction of storage failure is extremely critical for network systems to provide a timely and continuous service to their users. Each storage device, however, may have its own characteristics (e.g., storage amount, preferable working conditions, durability, reliability, etc.). This makes effective prediction of storage device failure very difficult. In addition, the fact that network systems can have multiple storage devices that were manufactured by various manufacturers on different dates makes failure prediction even more challenging.

BRIEF DESCRIPTION OF THE DRAWINGS

Embodiments disclosed herein may be better understood by referring to the following Detailed Description in conjunction with the accompanying drawings.

DETAILED DESCRIPTION

Figure 1:
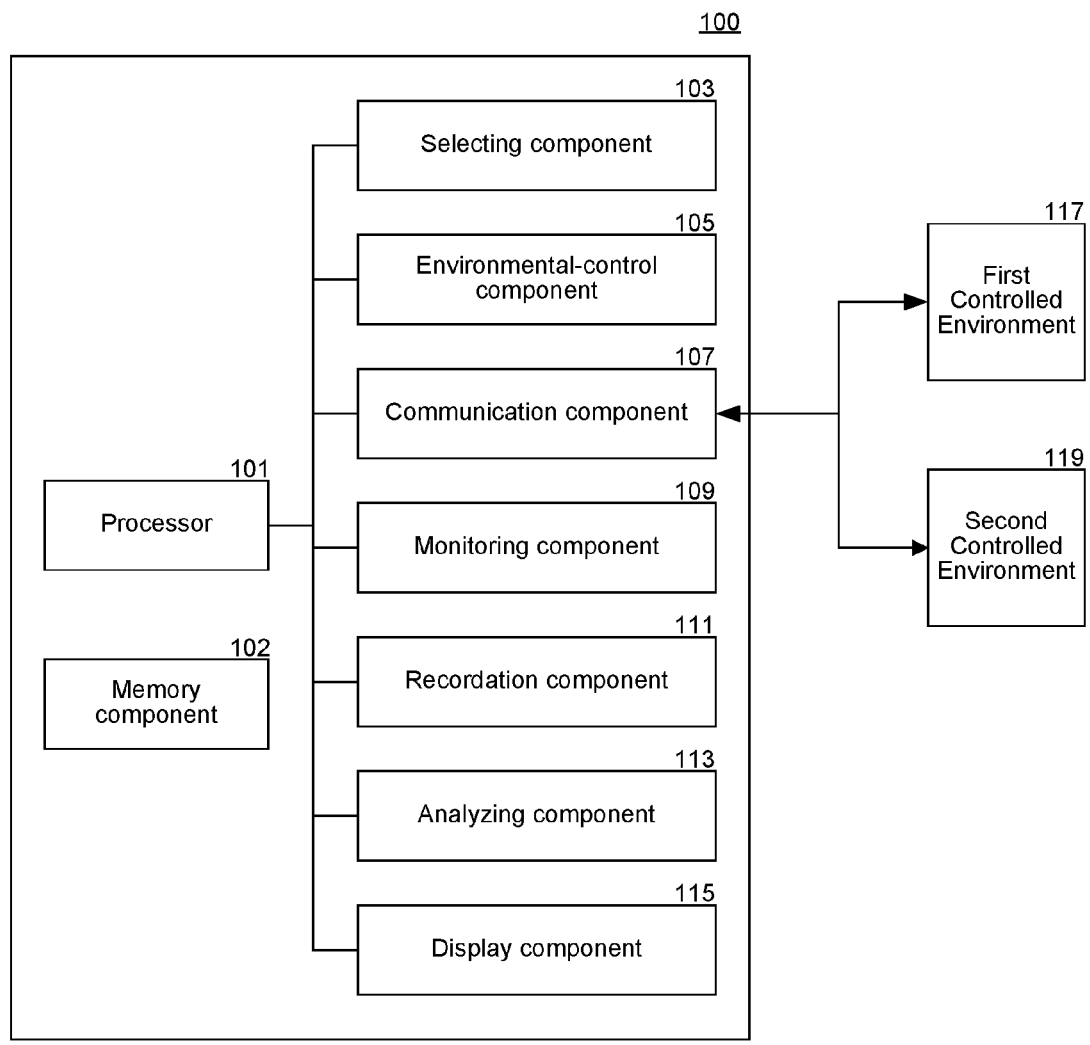
FIG. 1 is a block diagram illustrating a system for analyzing storage devices in accordance with various embodiments of the present disclosure.

Embodiments are disclosed for efficiently analyzing storage devices. More particularly, a system of the present disclosure can predict failure of a target storage device by analyzing multiple storage devices that have characteristics similar to (e.g., manufactured at the same factory site) or the same as (e.g., manufactured in the same batch of production) characteristics of the target storage device. The analysis includes positioning the multiple storage devices in a controlled environment (e.g., including virtual environments and physical spaces). The system then performs a series of analytical tests on the multiple storage devices, stores the results of the tests, analyzes the results, generates a set of predicted characteristic information (e.g., time life) of the target storage device, and presents the set of characteristic information to a system administrator. With the set of characteristic information of the target storage device, the administrator can have a better understanding of when he or she needs to replace or repair the target storage device after the target storage device is employed in a real-world operation. This is advantageous for a network system that utilizes a huge number of storage devices to effectively manage its storage devices so as to provide a smooth and non-interrupted service to its users.

One aspect of the present disclosure is to provide a customized testing environment for analyzing storage devices. In some embodiments, the system can build up a controlled environment that has environmental conditions similar to or substantially the same as the environmental conditions of a real-world environment in operation. For example, the controlled environment can be a physical rack (e.g., a computer rack having a metal frame used to hold various types of storage devices or other devices) or a virtual rack (e.g., a distributed network space that can accommodate multiple storage devices to be analyzed). The system enables a system operator to administer the controlled environment by adjusting one or more environmental conditions in the controlled environment. Examples of the environmental conditions include the temperature, air pressure, air quality (e.g., an amount of an air pollutant that may be harmful to a storage device), and humidity of the controlled environment. Accordingly, the system operator can create and maintain the controlled environment in a way that best suits his or her testing plans for the storage devices.

Another aspect of the present disclosure is to provide a set of customized tests for analyzing storage devices. In some embodiments, the system enables a system operator to form a testing cycle and repeatedly perform the testing cycle until a predetermined criterion is met (e.g., failure of a storage device after a period of time, such as six months, etc.). The system also enables the system operator to determine which tests should be in the testing cycle and how long each test should be performed. For example, the system operator can decide to have a seven-day testing cycle that includes a half-day environmental test (e.g., setting the temperature of the controlled environment at 60 degrees Celsius), a half-day power-on/off test (e.g., repeatedly turning on and off the power of a storage device), a three-day read-write test (e.g., frequently reading and writing a storage device according to a predefined read-write pattern), and a three-day input-output test (e.g., continuously simulating input-output activities on a storage device according to on a predefined input-output pattern). In some embodiments, these tests can overlap with one another. For example, the environmental test can continue through the whole testing cycle. Accordingly, the system can perform a customized testing cycle for storage devices according to the system operator's need.

Yet another aspect of the present disclosure is to provide a system that enables a system operator to effectively and timely analyze the characteristics of storage devices. The system monitors the statuses of all (or at least some of, in some embodiments) storage devices, stores the statuses, analyzes the statuses to generate an analytical result, and presents (e.g., visually presents via a user interface) the analytical result to the system operator. The analytical result can be presented periodically (e.g., daily) or in a real-time manner. In some embodiments, the system can directly present the statuses of the storage devices to the system operator, without further analysis. Accordingly, the system can keep the system operator constantly informed and enable him or her to adjust testing parameters (e.g., temperature in the controlled environment) whenever appropriate. The system also enables the system operator to manage the testing cycle remotely.

Examples of the method for analyzing a target storage device in accordance with the present disclosure are described below. The system first selects multiple storage devices to be analyzed based on the characteristics of the target storage device. For example, the selection can be made based on manufacturers of the storage devices, manufacture dates of the storage devices, manufacturing factory sites (e.g., a factory in China or a factory in Mexico) of the storage devices, etc. The system then assigns the selected multiple storage devices to one or more testing groups. Advantages of having multiple testing groups include that it enables the system operator to evaluate the influence from various controlled factors (e.g., the concept of control groups and experiment groups). For example, the system operator can have two testing groups—one in a controlled environment with a temperature of 40 degrees Celsius, the other in another controlled environment that has a temperature of 60 degrees Celsius. By doing so, the system operator can understand the impact of temperature on the storage devices to be analyzed.

When the testing groups are determined, the system then positions the testing groups in corresponding controlled environments. The system enables the system user to select suitable environmental conditions for each controlled environment and then initiate an environmental test. According to the system operator's testing plan, the system then performs a combination of suitable tests for the storage devices in each controlled group. Examples of such tests include a power pattern test (e.g., changing power supplied to a storage device, including turning on and off), a file system test (e.g., mounting or unmounting a file system to a storage device), a read-write test (e.g., a read-write-verify test, a random read-write test, etc.), an input-output replay test (e.g., a simulation of real-world input-output patterns on a storage device), and other suitable tests. During the testing period, the system constantly monitors and stores the status of the storage devices in each controlled group.

After a period of time or an occurrence of a specific event, such as failure of a storage device, the system stops the tests and analyzes the stored statuses of the storage devices to form an analytical result. For example, the analytical result can indicate that the storage devices made by manufacturer A at factory site B would fail after six months of testing in a controlled environment. The analytical result is useful for helping the system operator plan when to replace or repair the storage devices with similar characteristics when they are put in real-world operation.

In the foregoing and following descriptions, although the analysis of storage devices is discussed in various embodiments, it is to be understood that other types of hardware can also be analyzed. Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Several embodiments are described in more detail in reference to FIGS. 1-4. FIG. 1 is a block diagram illustrating a system 100 for analyzing storage devices in accordance with various embodiments of the present disclosure. As shown in FIG. 1, the system 100 includes a processor 101, a memory component 102, a selecting component 103, an environmental-control component 105, a communication component 107, a monitoring component 109, a recordation component 111, an analyzing component 113, and a display component 115. The processor 101 is coupled to other components and configured to control the same in the system 100. The memory component 102 is configured to temporarily store data to be processed and/or to store intermediate results during operation.

As shown in FIG. 1, the system 100 can communicate with a first controlled environment 117 and a second controlled environment 119 via the communication component 107. The first controlled environment 117 includes a first group of the storage devices, and the second controlled environment 119 includes a second group of the storage devices. In other embodiments, the system 100 can communicate with one single controlled environment or more than two controlled environments, depending on suitable testing plans. The system 100 can perform suitable tests on the multiple storage devices in the first and second controlled environments 117 and 119, respectively. In some embodiment, the system 100 can communicate with the first and second controlled environments 117 and 119 through a wired or wireless network such as the Internet or a corporate intranet. In other embodiments, the system 100 can directly (e.g., without a network) communicate with the first and second controlled environments 117 and 119.

In the illustrated embodiment, the selecting component 103 is configured to select multiple storage devices to be analyzed and assign them to testing groups that correspond to the controlled environments. For example, a system operator can select, by the selecting component 103, two groups of storage devices and assign them to a first testing group associated with the first controlled environment 117 and a second testing group associated with the second controlled environment 119. Factors to consider when selecting storage devices and assigning testing groups include suitable testing plans, suitable testing cycles or periods, types of tests to be performed, the number of the storage devices to be tested or analyzed, the (physical or virtual) locations of the controlled environments, available computing resources, etc.

In the illustrated embodiment, the environmental-control component 105 is configured to initiate or set up the first and second controlled environments 117 and 119. For example, the system operator can set up the environmental conditions (e.g., temperature, air pressure, air quality, humidity, etc.) of the first and second controlled environments 117 and 119, respectively, by using the environmental-control component 105. In some embodiments, the environmental conditions can be determined based on suitable testing plans, suitable testing cycles or periods, types of tests to be performed, the way that the storage devices are used in a real world operation, etc.

As shown in FIG. 1, the communication component 107 is configured to communicate with the first and second controlled environments 117 and 119. For example, the communication component 107 can transmit instructions to adjust environmental conditions in the first and second controlled environments 117 and 119. As another example, the communication component 107 can receive the status of the storage devices in the first and second controlled environments 117 and 119.

In the illustrated embodiment, the monitoring component 109 is configured to monitor the status of the storage devices in the first and second controlled environments 117 and 119. The status of the storage devices can include any suitable characteristic or parameter associated with the storage devices that can indicate whether the storage devices are working properly or abnormally (e.g., working temperature, data transmission rate, required time for a single read-write action, etc.). In some embodiments, the status of the storage devices can be monitored continuously (e.g., constantly checking whether a storage device functions normally or fails to function). In other embodiments, the status of the storage devices can be monitored periodically (e.g., checking the vibration caused by a storage device once a week) or occasionally (e.g., verifying the correctness of the data stored on a storage device sporadically).

In the illustrated embodiment, the recordation component 111 is configured to keep recording the status of the storage devices in each controlled environment. In some embodiments, the recorded status can be stored in the controlled environment (e.g., in a memory or a local database associated with the controlled environment) and transmitted back to the system 100 (e.g., through the communication component 107) periodically (e.g., daily or every testing cycle). In other embodiments, the recorded status can be transmitted back to the system 100 in a real-time or an on-demand manner.

After the system 100 receives the recorded statuses of the storage devices, the analyzing component 113 can analyze the recorded statues so as to generate an analytical result. In some embodiments, the analyzing component 113 can perform analyses based on the system operator's testing plan on the storage devices. For example, the system operator may be particularly interested in determining the durability of the storage devices when working under a high ambient temperature. As another example, the system operator may want to focus on analyzing the data transmission rate of the storage devices (e.g., a change of the data transmission rate may be an indication of failure of a storage device). The analytical result can then be presented to the system operator in a visually organized way (e.g., through a customized user interface) by the display component 115. In some embodiments, the analytical result can be presented to the system operator via any other suitable signal, such as audible or tactile signals (e.g., sending a vibration alarm to a wearable device of the system operator).

Figure 2:
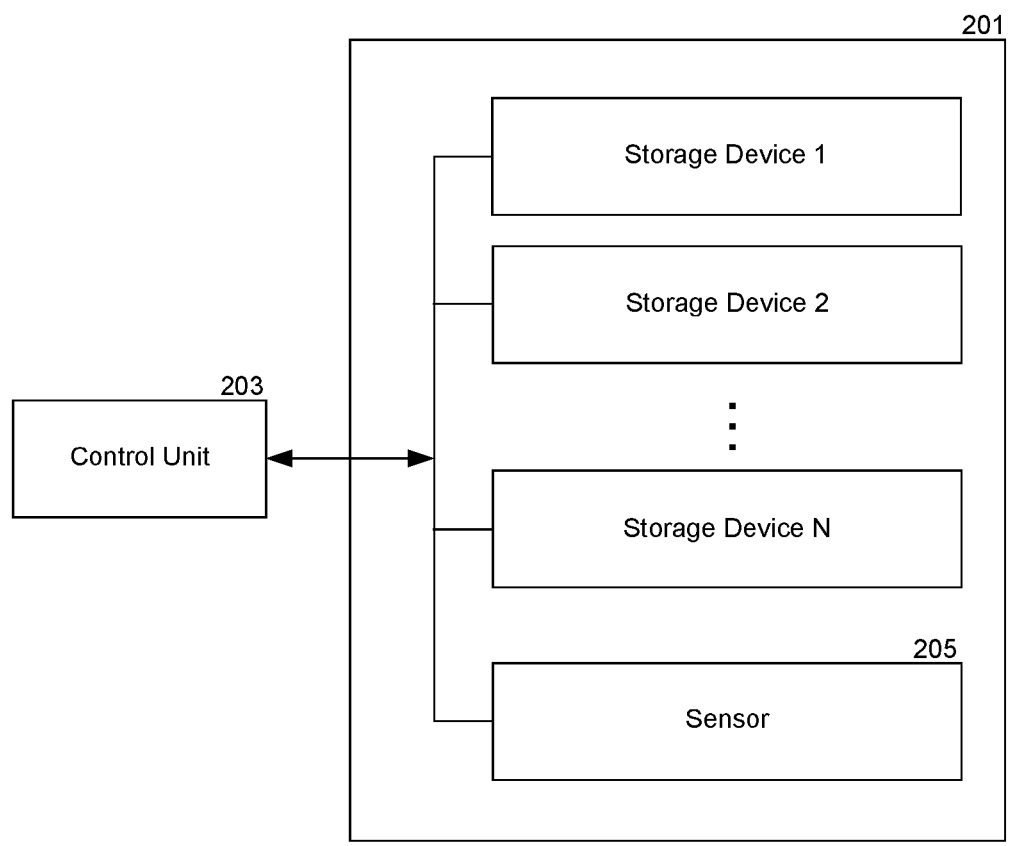
FIG. 2 is a block diagram illustrating another system for analyzing storage devices in accordance with various embodiments of the present disclosure.

FIG. 2 is a block diagram illustrating a system 200 for analyzing storage devices in accordance with various embodiments of the present disclosure. The system 200 is used to analyze multiple storage devices 1-N. As shown in FIG. 2, the system 200 includes a rack 201 and a control unit 203 coupled to the rack 201. In some embodiments, the rack 201 can be a physical rack. For example, the physical rack can include a frame for mounting the multiple storage devices 1-N thereon. In another example, the rack 201 can include a housing to enclose the multiple storage devices 1-N. In other embodiments, the rack 201 can be a virtual rack. For example, the virtual rack can be distributed network spaces that can accommodate the multiple storage devices 1-N. As shown in FIG. 2, the rack 201 can include one or more sensors 205 for measuring the environmental conditions in the rack 201. In some embodiments, the sensor 205 can be an external sensor, such as a temperature sensor that measures the temperature of the rack 201. In other embodiments, the sensor 205 can be a sensor attached to the storage devices 1-N, such as a vibration sensor that can measure vibration of the storage devices 1-N.

In the illustrated embodiment, the control unit 203 can perform functions similar to the functions of the system 100 as discussed above. For example, the control unit 203 can (1) select multiple storage devices to be analyzed and assign them to the rack 201; (2) initiate or set up the rack 201 (including determining the environmental conditions therein); (3) communicate with the rack 201; (4) monitor the status of the storage devices in the rack 201; (5) record the statuses of the storage devices in the rack 201; (6) analyze the recorded statuses to form an analytical result; and/or (7) present the analytical result to a system operator. In some embodiments, the control unit 203 can be a portable computing device (e.g., a notebook, smartphone, etc.). In other embodiments, the control unit 203 can be a computing device attached to the rack 201.

Figure 3:
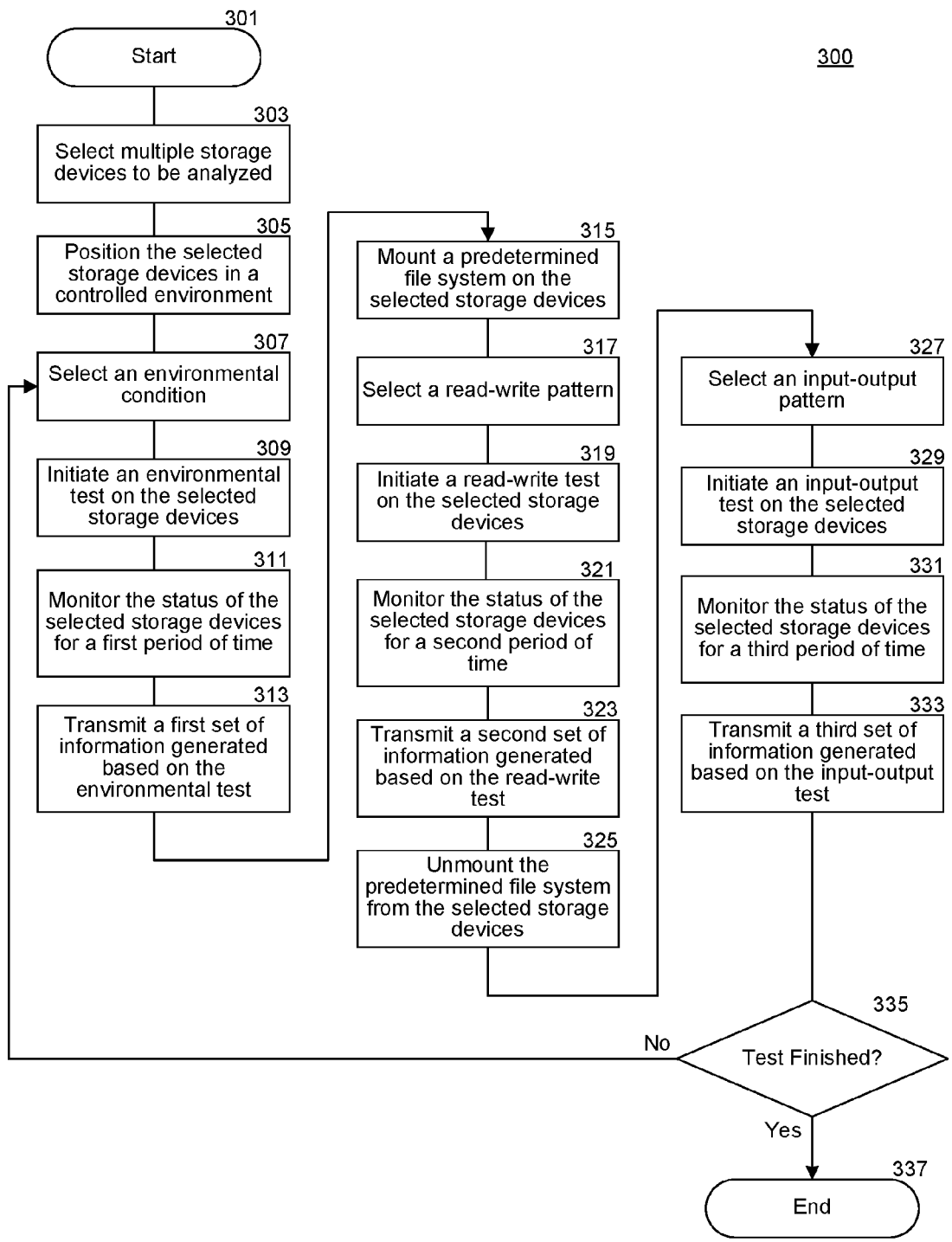
FIG. 3 is a flow diagram illustrating a routine for implementing a method of analyzing storage devices in accordance with various embodiments of the present disclosure.

FIG. 3 is a flow diagram illustrating a routine 300 for implementing a method of analyzing storage devices in accordance with various embodiments of the present disclosure. The routine 300 can be implemented by a system, such as the systems 100 and 200 discussed above. The routine 300 starts at block 301. At block 303, the system can first select multiple storage devices to be analyzed. For example, a system operator may be considering employing a large number of hard disk drives (e.g., the "target" storage device) made by manufacturer X, and he or she wants to know the durability of these hard disk drives under specific working conditions (e.g., conditions in a real-world operation). The system operator can then select multiple hard disk drives with characteristics similar to or the same as the characteristics of the "target" storage device.

At block 305, the system can position the selected storage devices in a controlled environment (e.g., when the controlled environment is a physical rack). In other embodiments, the system can assign the selected storage devices to the controlled environment (e.g., when the controlled environment is a virtual network space). At block 307, the system can then select an environmental condition for the controlled environment (e.g., setting temperature as 60 degrees Celsius). At block 309, the routine 300 proceeds by initiating an environmental test on the selected storage devices under the selected environmental conditions.

When the environmental test continues, the system monitors (and records) the status of the selected storage devices for a first period of time (e.g., 24 hours), as shown at block 311. At block 313, the system can transmit a first set of information generated based on the environmental test to a system operator. In some embodiments, the first set of information can be generated based on an analysis of the statuses of the selected storage devices. In some embodiments, the first set of information can be generated and transmitted after the environmental test. In other embodiments, the first set of information can be generated and transmitted during the environmental test.

At block 315, the system can mount a predetermined file system on the selected storage devices. The predetermined file system can include any suitable file systems required by the tests that are planned to be performed on the selected storage devices. At block 317, the system enables the system operator to select a read-write pattern associated with a read-write test. At block 319, the system initiates the read-write test on the selected storage devices based on the selected read-write pattern. When the read-write test continues, the system monitors (and records) the status of the selected storage devices for a second period of time (e.g., 72 hours), as shown at block 321. At block 323, the system can transmit a second set of information generated based on the read-write test to the system operator (e.g., generated based on an analysis of the statuses of the selected storage devices). At block 325, the system unmounts the predetermined file system from the selected storage devices.

At block 327, the system enables the system operator to select an input-output pattern (e.g., an input-output replay pattern similar to the input-output pattern of a real-world operation) associated with an input-output test. At block 329, the routine 300 continues by initiating the input-output test on the selected storage devices based on the selected input-output pattern. When the input-output test continues, the system monitors (and records) the status of the selected storage devices for a third period of time (e.g., 72 hours), as shown at block 331. At block 333, the system can transmit a third set of information generated based on the input-output test to the system operator (e.g., generated based on an analysis of the statuses of the selected storage devices). In some embodiments, the combination of the first, second, and third periods of time can be collectively called a testing cycle (e.g., seven days in this illustrated embodiment). In some embodiments, the system operator can determine the number of testing cycles to be completed. For example, the system operator can plan to complete 26 testing cycles. In other embodiments, the system operator can have different numbers of testing cycles.

At decision block 335, the routine 300 proceeds to determine whether the tests to be performed on the selected storage devices are completed. If so, the routine 300 ends at block 337. If not, the routine 300 goes back to block 307 so as to finish the remaining testing cycles.

Figure 4:
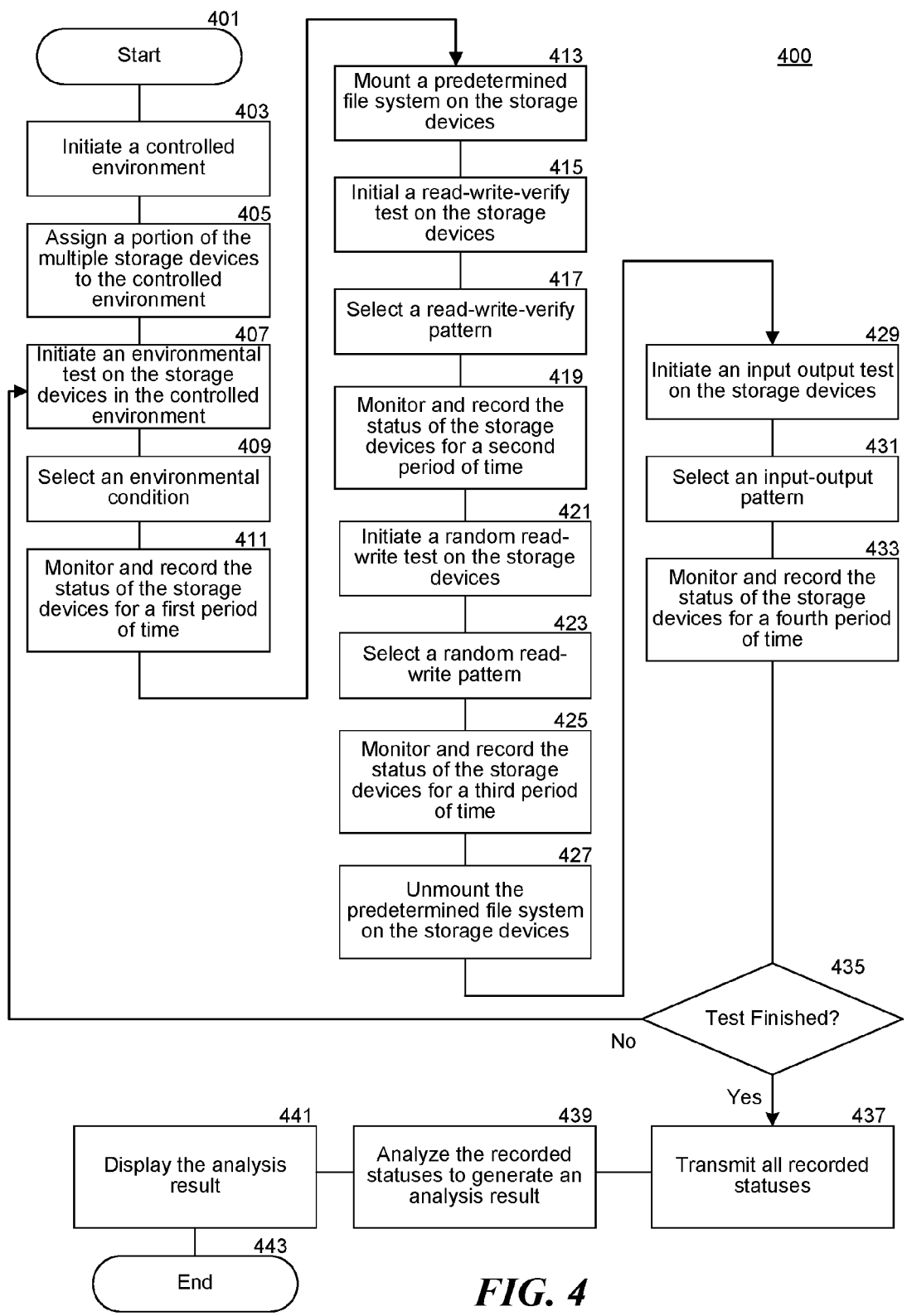
FIG. 4 is a flow diagram illustrating another routine for implementing a method of analyzing storage devices in accordance with various embodiments of the present disclosure.

FIG. 4 is a flow diagram illustrating a routine 400 for implementing a method of analyzing storage devices in accordance with various embodiments of the present disclosure. The routine 400 can be used to analyze multiple storage devices that were made in the same (production) batch. The system in accordance with the present disclosure can initial the routine 400 at block 401. The routine 400 proceeds to block 403 by initiating a controlled environment. At block 405, the system can assign at least a portion of the multiple storage devices to the controlled environment.

At block 407, the system can initiate an environmental test on the storage devices in the controlled environment. At block 409, the system can then select one or more environmental conditions for the environmental test. Then the system can perform the environmental test on the storage devices in the controlled environment. When the environmental test continues, the system can monitor and record the statuses of the storage devices in the controlled environment for a first period of time (e.g., 24 hours), as shown at block 411.

At block 413, the system can mount a predetermined file system on the selected storage devices. The predetermined file system can include any suitable file systems required by the tests that are planned to be performed on the storage devices in the controlled environment. At block 415, the system initiates a read-write-verify test (e.g., a test that sequentially reads, writes, and verifies sectors of a storage device) on the storage device in the controlled environment. At block 417, the system enables the system operator to select a read-write-verify pattern (e.g., starting the test from a predetermined track) associated with the read-write-verify test. Then the system can perform the read-write-verify test under the selected read-write-verify pattern. When the read-write-verify test continues, the system can monitor and record the status of the storage devices in the controlled environment for a second period of time (e.g., 48 hours), as shown at block 419.

When the read-write-verify test is finished, the routine 400 continues to block 421 and the system initiates a random read-write test (e.g., a test that randomly reads and writes sectors of a storage device) on the storage device in the controlled environment. At block 423, the system enables the system operator to select a random read-write pattern (e.g., starting the test from a predetermined track) associated with the random read-write test. Then the system can perform the random read-write test under the selected random read-write pattern. When the random read-write test continues, the system can monitor and record the status of the storage devices in the controlled environment for a third period of time (e.g., 24 hours), as shown at block 425. At block 427, the system unmounts the predetermined file system from the storage devices in the controlled environment.

At block 429, the routine 400 continues by initiating an input-output test on the storage devices in the controlled environment. At block 431, the system enables the system operator to select an input-output pattern (e.g., an input-output replay pattern similar to the input-output pattern of a real-world operation) associated with the input-output test. The system then performs the input-output test. When the input-output test continues, the system monitors and records the status of the storage devices in the controlled environment for a fourth period of time (e.g., 72 hours), as shown at block 433. In some embodiments, the combination of the first, second, third, and fourth periods of time can be collectively called a testing cycle (e.g., seven days in this illustrated embodiment). In some embodiments, the system operator can determine the number of testing cycles to be completed.

At decision block 435, the routine 400 proceeds to determine whether the tests to be performed on the storage devices in the controlled environment are completed. If the tests to be performed have not been completed, the routine 400 then goes back to block 407 so as to finish the remaining testing cycles. If the tests to be performed have been completed, the routine 400 proceeds to block 437 and the system transmits all recorded statuses of the storage devices in the controlled environment to a control unit (e.g., the control unit 203) or an analyzing component (e.g., the analyzing component 113). At block 439, the system further analyzes the recorded statuses and generates an analytical result. The system then displays the analytical result to the system operator at block 441. The routine 400 then ends at block 443.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the present disclosure is not limited except as by the appended claims.

We claim:

1. A system for analyzing storage devices, comprising:
   a processor;
   a memory component coupled to the processor;
   a selecting component coupled to the processor and configured to select multiple storage devices to be analyzed;
   an environmental control component coupled to the processor and configured to initiate a controlled environment and to determine an environmental condition in the controlled environment;

a communication component coupled to the processor and configured to communicate with the controlled environment;

a monitoring component configured to monitor a status of the selected multiple storage devices;

a recordation component coupled to the processor and configured to record the status of the selected multiple storage devices;

an analyzing component coupled to the processor and configured to analyze the status so as to generate a result; and a display component coupled to the processor and configured to present the result.

2. The system of claim 1, further comprising a set-up component coupled to the processor and configured to assign the selected multiple storage devices to the controlled environment.

3. The system of claim 2, wherein the set-up component is configured to mount a file system on the selected multiple storage devices.

4. The system of claim 2, wherein the environmental control component is configured to perform an environmental test, a read-write-verify test, a random read-write test, and an input-output test on the selected multiple storage devices.

5. A method for analyzing a target storage device, comprising:

selecting multiple testing storage devices based at least in part on a manufacture date of the target storage device;

assigning at least a portion of the multiple testing storage devices to a testing group;

positioning the testing group in a controlled environment;

initiating an environmental test on the multiple testing storage devices in the testing group;

selecting an environmental condition in the controlled environment;

monitoring the multiple testing storage devices in the testing group for a first period of time;

transmitting a first set of information generated based on the environmental test to a control unit;

initiating a power pattern test on the multiple testing storage devices in the testing group;

selecting a power pattern for the multiple testing storage devices in the testing group;

monitoring the multiple testing storage devices in the testing group for a second period of time;

transmitting a second set of information generated based on the power pattern test to the control unit;

mounting a predetermined file system on the multiple testing storage devices in the testing group;

initiating a read-write test on the multiple testing storage devices in the testing group;

selecting a read-write pattern for the multiple testing storage devices in the testing group;

monitoring the multiple testing storage devices in the testing group for a third period of time;

transmitting a third set of information generated based on the read-write test to the control unit;

unmounting the predetermined file system on the multiple testing storage devices in the testing group;

initiating an input-output test on the multiple testing storage devices in the testing group;

selecting an input-output pattern for the multiple testing storage devices in the testing group;

monitoring the multiple testing storage devices in the testing group for a fourth period of time;

transmitting a fourth set of information generated based on the input-output test to the control unit; and analyzing, by the control unit, the first, second, third, and fourth sets of information so as to form a set of characteristic information of the target storage device.

6. The method of claim 5, further comprising selecting the multiple testing storage devices based at least in part on a manufacturer of the target storage device.

7. The method of claim 5, wherein the portion is a first portion, the testing group is a first testing group, and the controlled environment is a first controlled environment, and wherein the method further comprises:

assigning a second portion of the multiple testing storage devices to a second testing group, wherein the second testing group is in a second controlled environment;

performing the power pattern test on the multiple testing storage devices of the second testing group so as to form a fifth set of information;

performing the environmental test on the multiple testing storage devices of the second testing group so as to form a sixth set of information;

performing the read-write test on the multiple testing storage devices of the second testing group so as to form a seventh set of information;

performing the input-output test on the multiple testing storage devices of the second testing group so as to form an eighth set of information; and analyzing the fifth, sixth, seventh, and eighth sets of information so as to form the set of characteristic information of the target storage device.

8. The method of claim 5, wherein the controlled environment includes a rack.

9. The method of claim 5, wherein the environmental condition is one of the temperature, air pressure, air quality, and humidity in the controlled environment.

10. The method of claim 5, wherein the environmental test continues when the power pattern test is initiated, and wherein the first period of time is about 24 hours, the second period of time is about 12 hours, the third period of time is about 72 hours, and the fourth period of time is about 72 hours.

11. The method of claim 5, wherein the power pattern includes turning on and off the power of the multiple testing storage devices in the testing group.

12. The method of claim 5, wherein the read-write test includes a read-write-verify test and a random read-write test.

13. The method of claim 5, wherein the input-output test includes an input-output replay test.

14. The method of claim 5, wherein the set of characteristic information includes an estimated failure date.

15. A method for analyzing a batch of storage devices, comprising:

selecting a portion of the batch of storage devices;

positioning the portion of the batch of storage devices in a controlled environment;

initiating an environmental test on the portion of the batch of storage devices;

selecting an environmental condition in the controlled environment;

monitoring the portion of the batch of storage devices for a first period of time;

transmitting a first set of information generated based on the environmental test to a control unit;

mounting a predetermined file system on the portion of the batch of storage devices;

initiating a read-write-verify test on the portion of the batch of storage devices;

selecting a read-write-verify pattern for the portion of the batch of storage devices;

monitoring the portion of the batch of storage devices for a second period of time;

transmitting a second set of information generated based on the read-write-verify test to the control unit;

initiating a random read-write test on the portion of the batch of storage devices;

selecting a random read-write pattern for the portion of the batch of storage devices;

monitoring the portion of the batch of storage devices for a third period of time;

transmitting a third set of information generated based on the random read-write test to the control unit;

unmounting the predetermined file system on the batch of storage devices;

initiating an input-output test on the batch of storage devices;

selecting an input-output pattern for the batch of storage devices;

monitoring the batch of storage devices for a fourth period of time;

transmitting a fourth set of information generated based on the input-output test to the control unit; and analyzing, by the control unit, the first, second, third, and fourth sets of information so as to form a set of characteristic information of the batch of storage devices.

16. The method of claim 15, further comprising:

initiating a power pattern test on the portion of the batch of storage devices;

selecting a power pattern for the portion of the batch of storage devices;

monitoring the portion of the batch of storage devices for a fifth period of time;

transmitting a fifth set of information generated based on the power pattern test to the control unit; and analyzing, by the control unit, the fifth set of information so as to form the set of characteristic information of the batch of storage devices.

17. The method of claim 15, wherein the controlled environment includes a virtual rack.

18. The method of claim 15, wherein the environmental condition is one of the temperature, air pressure, and humidity in the controlled environment, and wherein the first period of time is about 24 hours, the second period of time is about 72 hours, and the third period of time is about 72 hours.

19. The method of claim 15, wherein the input-output test includes an input-output replay test utilizing a set of algorithms designed for distributed data storages.

20. The method of claim 15, wherein the set of characteristic information includes a parameter regarding durability.

* * * * *